Patented July 10, 1951

2,559,808

UNITED STATES PATENT OFFICE 2,559,808

DYESTUFF PREPARATIONS FOR PRINTING

Arthur Topham, Blackley, Manchester, England, assignor to Imperial Chemical Industries Limited, a corporation of Great Britain No Drawing. Application January 27, 1949, Serial No. 73,236. In Great Britain January 26, 1948

8 Claims. (Cl. 8—35)

This invention relates to dyestuff preparations and more particularly it relates to dyestuff preparations containing leuco sulphuric ester derivatives of vat dyestuffs for use in the printing of textile materials.

According to my invention I provide new dyestuff preparations for use in the printing of textile materials which comprise a leuco sulphuric ester derivative of a vat dyestuff and an organic compound containing a sulphonic acid group and an isothiourea or substituted isothiourea group.

The organic compounds used in my new dyestuff preparations have a solubilising or dispersing action on the leuco sulphuric esters.

As a suitable organic compound for use in the invention there may be mentioned 2-benzyl-thio-$\Delta^2$-iminazoline-m-sulphonic acid which may be prepared by heating m-sulphobenzyldimethylphenylammonium with ethylene thiourea in aqueous medium.

The leuco sulphuric ester derivative of a vat dyestuff used in the invention may be a derivative of a vat dyestuff of the anthraquinone, indigo or thioindigo series and it may be added to the dyestuff preparation in the form of a salt, for example the sodium salt.

The present invention is directed especially to the use of those leuco sulphuric ester derivatives which give sparingly soluble alkali metal or ammonium salts and which accordingly give weak and dull prints when used for printing textile fabrics by the conventional methods.

If required urea may also be added to the dyestuff preparation.

The new dyestuff preparations of my invention when made up into printing pastes by known methods give much brighter and stronger prints than those obtainable from the sparingly soluble leuco sulphuric derivative of the vat dyestuff in the absence of the organic compound as hereinbefore defined.

The invention is illustrated but not limited by the following examples in which the parts are by weight.

Example 1

10 parts of a dyestuff paste containing 25% of the sodium salt of the acid sulphuric ester of leucodibromanthanthrone
10 parts of urea and
5 parts of 2-benzylthio-$\Delta^2$-iminazoline-m-sulphonic acid are dissolved in
12 parts of water. The solution is added to
60 parts of starch tragacanth thickening and
3 parts of a 30% sodium nitrite solution are then added.

100 parts

The paste so obtained is printed onto cotton fabric. The fabric is then dried and the print developed by padding the fabric through 2% sulphuric acid solution at 70° C. rinsing in water and soaping at the boil. A very bright, level and strong orange print is obtained.

In the above example the 2-benzylthio-$\Delta^2$-iminazoline-m-sulphonic acid may be replaced with substantially the same result by 2-($\beta$-sulphoethylthio-)-$\Delta^2$-iminazoline (which may be prepared by heating sodium-2-bromoethane sulphonate with ethylene thiourea in aqueous medium) or by N:N:N'-trimethyl-S-m-sulphobenzylisothiourea (which may be prepared by heating m-sulphobenzyldimethylphenylammonium with N:N:N'-trimethylthiourea in aqueous medium) or by N:N'-dimethyl-S-m-sulphobenzylisothiourea (which may be prepared by heating m-sulphobenzyldimethylphenylammonium with N:N'-dimethylthiourea in aqueous medium).

Example 2

10 parts of a dyestuff paste containing 25% of the sodium salt of the acid sulphuric ester of leucodibromanthanthrone
10 parts of urea and
5 parts of 2-($\beta$-sulphoethylthio)-$\Delta^2$-iminazoline are dissolved in
7 parts of water. The solution is added to
60 parts of starch tragacanth thickening previously neutralised with ammonia.
2 parts of a 50% ammonium thiocyanate solution
4 parts of a 10% sodium chlorate solution and
2 parts of a 1% ammonium vanadate solution are then added.

100 parts

The paste so obtained is printed onto cotton fabric. The fabric is then dried and the print is developed by steaming during 10 minutes, rinsing in water and soaping at the boil. A very bright, level and strong orange print is obtained.

In the above example the 2-($\beta$-sulphoethylthio-)-$\Delta^2$-iminazoline may be replaced with substantially the same result by N:N:N'-trimethyl-S-m-sulphobenzylisothiourea or by N:N'-dimethmethyl-S-m-sulphobenzylisothiourea.

I claim:

1. Dyestuff preparations for use in the printing of textile materials comprising a leuco sulphuric ester derivative of a vat dyestuff and a sulphonated isothiourea of the formula

R—CH$_2$—S—X wherein R is a radical selected from the group consisting of sulphonated alkyl radicals and sulphonated monocyclic aromatic hydrocarbon radicals and X is a radical selected from the group consisting of

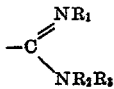

and

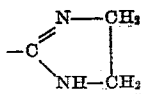

$R_1$, $R_2$, and $R_3$ being selected from the group consisting of hydrogen and alkyl radicals.

2. Dyestuff preparations for use in the printing of textile materials comprising a leuco sulphuric ester derivative of a vat dyestuff and 2-benzylthio-$\Delta^2$-iminazoline-m-sulphonic acid.

3. Dyestuff preparations for use in the printing of textile materials comprising a leuco sulphuric ester derivative of a vat dyestuff and N:N'-dimethyl-S-m-sulphobenzylisothiourea.

4. Dyestuff preparations for use in the printing of textile materials comprising a leuco sulphuric ester derivative of a vat dyestuff and N:N:N'-trimethyl-S-m-sulphobenzylisothiourea.

5. Dyestuff preparations for use in the printing of textile materials comprising a leuco sulphuric ester derivative of a vat dyestuff, urea, and a sulphonated isothiourea of the formula $$R\text{---}CH_2\text{---}S\text{---}X$$

wherein R is a radical selected from the group consisting of sulphonated alkyl radicals and sulphonated monocyclic aromatic hydrocarbon radicals and X is a radical selected from the group consisting of

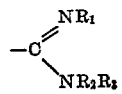

and

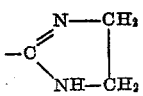

$R_1$, $R_2$, and $R_3$ being selected from the group consisting of hydrogen and alkyl radicals.

6. Dyestuff preparations for use in the printing of textile materials comprising a leuco sulphuric ester derivative of a vat dyestuff and 2-($\beta$-sulphoethylthio-)-$\Delta^2$-iminazoline.

7. Dyestuff preparations as claimed in claim 1 wherein said leuco sulphuric ester derivative is in the form of a sparingly soluble alkali metal salt.

8. Dyestuff preparations as claimed in claim 1 wherein said leuco sulphuric ester derivative is in the form of a sparingly soluble ammonium salt.

ARTHUR TOPHAM.

REFERENCES CITED

The following references are of record in the file of this patent:

FOREIGN PATENTS

| Number | Country | Date |
|---|---|---|
| 644,819 | Great Britain | Oct. 18, 1950 |
| 235,027 | Switzerland | Mar. 1, 1945 |